(12) United States Patent
Xiang et al.

(10) Patent No.: US 12,732,133 B2
(45) Date of Patent: Sep. 8, 2026

(54) INNOVATIVE THERMAL-MANAGED PHOTOVOLTAIC GLAZING MODULE

(71) Applicant: The Hong Kong University of Science and Technology, Hong Kong (CN)

(72) Inventors: Changying Xiang, Hong Kong (CN); Wanting Wang, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 18/882,744

(22) Filed: Sep. 12, 2024

(65) Prior Publication Data

US 2025/0096722 A1 Mar. 20, 2025

Related U.S. Application Data

(60) Provisional application No. 63/582,841, filed on Sep. 14, 2023.

(51) Int. Cl.
*H02S 20/26* (2014.01)
*H02S 30/00* (2014.01)

(52) U.S. Cl.
CPC .............. *H02S 20/26* (2014.12); *H02S 30/00* (2013.01)

(58) Field of Classification Search
CPC . H02S 20/26; H02S 30/00; E06B 7/28; E04B 3/66; E04B 3/28
See application file for complete search history.

(56) References Cited

U.S. PATENT DOCUMENTS 9,859,840 B2 1/2018 Den Boer et al.
2012/0317900 A1* 12/2012 Den Boer .......... G02B 19/0014 136/246
2013/0074918 A1* 3/2013 Jeong ...................... C03C 27/06 156/60

(Continued)

FOREIGN PATENT DOCUMENTS

AU 2019246842 B1 8/2020
CN 111952391 A 11/2020
CN 113871502 A 12/2021

OTHER PUBLICATIONS

Insulating Photovoltaic Transparent Glass. 2023. https://www.glasstopower.com/insulating-photovoltaic-transparent-glass/?lang=en.

(Continued)

*Primary Examiner* — Kourtney R S Carlson
(74) *Attorney, Agent, or Firm* — Idea Intellectual Limited; Sam T. Yip

(57) ABSTRACT

Provided herein is a thermal-managed photovoltaic glass glazing panel comprising a photovoltaic glazing a thermal insulation layer coated on the front surface of the photovoltaic glazing, wherein the thermal insulation layer includes a passive radiative cooling coating material; and a sound and thermal insulation module, wherein the sound and thermal insulation module comprises vacuum glazing, hollow glazing or a combination thereof, adhered to the rear side of the photovoltaic glazing. The photovoltaic glazing module of the present invention not only optimizes solar power generation through specific thermal management designs, but also minimizes both heat transfer and noise intrusion to the interior of the building, maintaining a quiet and stable internal ambient environment, minimizing impacts from the external environment.

3 Claims, 2 Drawing Sheets

(56) References Cited

U.S. PATENT DOCUMENTS

| | | | | |
|---|---|---|---|---|
| 2017/0248381 | A1 | 8/2017 | Yang et al. | |
| 2017/0317305 | A1* | 11/2017 | Hammond | H10K 30/83 |
| 2019/0036480 | A1* | 1/2019 | Barr | H10F 19/807 |
| 2019/0296684 | A1 | 9/2019 | Trocme | |

OTHER PUBLICATIONS

Syafiq, A., et al. (2023). Synthesis of transparent thermal insulation coating for efficient solar cells. Pigment & Resin Technology. 53.

Qiu, Changyu & Yang, Hongxing. (2020). Daylighting and overall energy performance of a novel semi-transparent photovoltaic vacuum glazing in different climate zones. Applied Energy. 276. 115414.

Huang, Junchao & Wang, Qiliang & Chen, Xi & Xu, Shiyuan & Yang, Hongxing. (2021). Experimental investigation and annual overall performance comparison of different photovoltaic vacuum glazings. Sustainable Cities and Society. 75. 103282.

* cited by examiner

INNOVATIVE THERMAL-MANAGED PHOTOVOLTAIC GLAZING MODULE

CROSS-REFERENCE TO RELEVANT APPLICATIONS

The present application claims priority from a U.S. provisional patent application Ser. No. 63/582,841 filed Sep. 14, 2023, and the disclosure of which are incorporated by reference in their entirety.

TECHNICAL FIELD

The present invention relates to photovoltaic glazing technology. More specifically, the photovoltaic glazing module of the present invention optimizes solar power generation through specific thermal management designs, and minimizing both heat transfer and noise intrusion to the interior of the building.

BACKGROUND

As the demand of renewable energy sources increases over the years, solar energy has long been a popular and widely adopted option, and various forms of solar energy generation technologies have been developed. Among them, photovoltaic glazing is catching more attention, as an innovative integration of traditional architectural glass and solar energy conversion technologies.

Photovoltaic glazing is a specialized glazing type that incorporates solar cells through lamination into glass panels, enabling the harnessing of solar radiation for electricity generation while serving as windows or building façades. This glazing also features integrated current lead-out devices and cables. Constructed from low-iron glazing, solar cell sheets, laminating films, rear glazing, and specialized metal conductors, the solar cell sheets are hermetically sealed between a sheet of low-iron glazing and a sheet of rear glazing.

This assembly represents a highly innovative high-tech glazing product for architectural applications. The employment of low-iron glazing over solar cells ensures a high transmission rate of sunlight.

In practical applications, maintaining a lower operational temperature for the photovoltaic glazing is beneficial for electricity generation. However, continuous exposure to sunlight leads to a gradual temperature increase, particularly during midday hours. Consequently, addressing the overheating challenge of photovoltaic glazing has become an urgent concern for professionals in the field.

In addition, as the photovoltaic glazing fundamentally serves as the façades and/or windows of buildings, the photovoltaic glazing should display certain crucial properties offered by traditional architectural glass, for example minimal heat transfer and noise intrusion, so as to maintain a comfortable internal environment of the building. The present invention addresses this need.

SUMMARY OF THE INVENTION

In one aspect, the present invention provides a thermal-managed photovoltaic glass glazing panel, comprising a photovoltaic glazing comprising low-iron glazing, solar cell sheet, laminating film, rear glazing and specialized metal conductors, wherein the solar cell sheet is hermetically sealed between the low-iron glazing and the rear glazing; a thermal insulation layer coated on the front surface of the photovoltaic glazing, wherein the thermal insulation layer includes a passive radiative cooling coating material; and a sound and thermal insulation module, wherein the sound and thermal insulation module comprises vacuum glazing, hollow glazing or a combination thereof, and wherein the sound and thermal insulation module is adhered to the rear side of the photovoltaic glazing.

The thermal-managed photovoltaic glazing panel has a light transmission rate of at least 40%, reduces radiation-induced temperature increase by 2-4 degrees Celsius, has a thermal transmittance of lower than 0.7 $W/m^2$ K across the panel, a solar heat gain coefficient of lower than 0.2 across the panel, and an average power output of at least 35 $W/m^2$ under illumination intensity of 1000 $W/m^2$.

In an embodiment of the first aspect, the sound and thermal insulation module of the thermal-managed photovoltaic glass glazing panel comprises a combination of vacuum glazing and hollow glazing.

In a further embodiment, the vacuum glazing and hollow glazing of the sound and thermal insulation module are connected using adhesive bonding.

In another aspect of the present invention, a solar power-generating glass construction material is provided for application to the exterior of a building comprising the aforementioned thermal-managed photovoltaic glass glazing panel.

The solar power-generating glass construction material has a light transmission rate of at least 40%, reduces radiation induced temperature increase by 2-4 degrees Celsius, has a thermal transmittance of lower than 0.7 $W/m^2$ K, a solar heat gain coefficient of lower than 0.2 across the panel, and an average power generation of at least 35 $W/m^2$ under illumination intensity of 1000 $W/m^2$.

BRIEF DESCRIPTION OF DRAWINGS

The appended drawings, where like reference numerals refer to identical or functionally similar elements, contain FIG.s of certain embodiments to further illustrate and clarify the above and other aspects, advantages and features of the present invention. It will be appreciated that these drawings depict embodiments of the invention and are not intended to limit its scope. The invention will be described and explained with additional specificity and detail through the use of the accompanying drawings in which.

DETAILED DESCRIPTION

Figure 1:
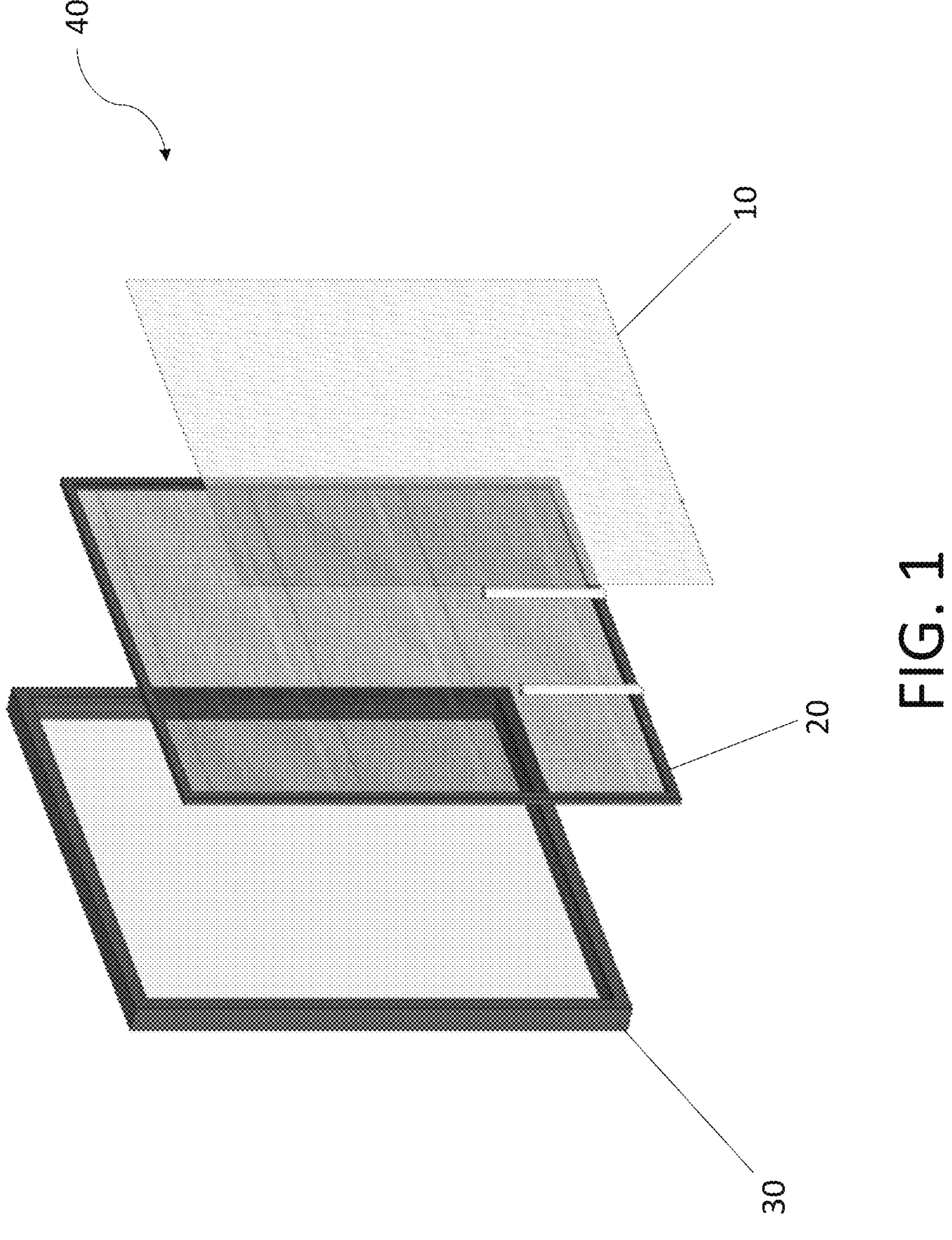
FIG. 1 illustrates the three-layered structure of the photovoltaic glazing module of the present invention. The photovoltaic glazing 20 is coated with a thermal insulation layer 10 on the front surface, whereas the rear side of the photovoltaic glazing 20 is adhered to a sound and thermal insulation module 30. The photovoltaic glazing should be aligned such that the thermal insulation layer 10 faces the general direction of sunlight (40).

As used in the disclosure herein, "glazing" refers to the glass component which is either incorporated into a window frame or a wall.

As used in the disclosure herein, "thermal transmittance", also known as U-value, refers to the rate at which heat passes through a material or an assembly of materials, expressed in watts per square metre per degree Kelvin ($W/m^2$ K). A lower U-value indicates better heat insulation properties of the material, and vice versa.

As used in the disclosure herein, "solar heat gain coefficient" (SHGC) is a dimensionless measurement of solar radiation transmission through a building part and hence becoming heat in the interior of a building. SHGC measurements range from 0 to 1, where 0 SHGC indicates total blocking of solar heat, and 1 SHGC indicates total transmission of solar heat.

Photovoltaic glazing is a technology incorporating solar cells into glass panels, which can be further integrated to architectures as windows or façades, thereby having the functionalities of both traditional architectural glass and solar power generators, available for a wide variety of applications ranging from commercial and residential buildings, skyscrapers to greenhouses, providing a promising choice of building material for sustainable and green architecture with reduced carbon footprint.

Typically, photovoltaic glazing comprises the following components:

Glass panes—usually two or more layers of glass would be involved, depending on the design; and particularly for photovoltaic glazing, higher transparency would be favored for the optimum amount of solar energy to be harnessed. Typically, a low-iron front glazing and a rear glazing is involved.

Photovoltaic cells—embedded in the glass panes, the solar cells can be made of mono- or polycrystalline silicon, or thin-film photovoltaic materials, e.g. amorphous silicon, cadmium telluride or copper indium gallium selenide for higher flexibility.

Laminating layers-transparent or semi-transparent material such as ethylene-vinyl acetate (EVA) or polyvinyl butyral (PVB) could act to laminate the photovoltaic cells from the glass panes.

Conductive layers—in particular, due to the necessity of transparency for solar energy capturing, transparent conductive oxides e.g. indium tin oxide would be preferred.

Edge seals—a sealant material is used to hermetically seal the solar cell between the glass panes.

As explained above, conventional photovoltaic glazing faces the problem of overheating upon prolonged sunlight exposure, which hampers the efficiency of power generation, leading to suboptimal energy conversion performance. In view of this, the present invention is designed to tackle the problem of overheating through the adoption of a thermal insulating layer on the front surface of the photovoltaic glazing, and a sound and thermal insulating module on the rear side of the photovoltaic glazing.

Specifically, the thermal insulating layer on the front surface of the photovoltaic glazing comprises passive radiative cooling layer, which is designed to reflect sunlight and dissipate heat through mid-infrared radiation emission. In view of the need of transparency for solar energy harnessing, polymer-based coatings such as polymethyl methacrylate or polyethylene, nanocomposite coatings with specific high emissivity and reflectivity properties, or silica would be preferred in this present invention.

Furthermore, the sound and thermal insulating module on the rear side of the photovoltaic glazing comprises hollow glazing, vacuum glazing or a combination of both.

Vacuum glazing involves two or more glass sheets, typically low-emissivity (low-e) glass, separated by a micrometer-level vacuum gap and hermetically sealed around the edges.

Hollow glazing, alternatively, is structurally very similar to vacuum glazing (i.e. glass sheets separated by a gap and hermetically sealed around the edges), with the vacuum gap replaced by a hollow spaced filled with air or inert gas (e.g. argon or krypton).

Both vacuum glazing and hollow glazing, as compare to single-pane glass, exhibit greatly increased heat insulation and sound insulation, thereby minimizing heat transfer and noise transmission from the external environment into the interior of the building.

EXAMPLES

Referring to FIG. 1, the exemplary photovoltaic glazing panel is made by applying a radiative cooling coating 10 to the front surface photovoltaic glazing 20 to provide the radiative cooling function of emitting infrared light into the outer space, and the rear side of the photovoltaic glazing 20 is fit and adhered into the sound and thermal insulating module 30.

The assembled photovoltaic glazing panel should be applied to a window frame or a wall, aligned in a fashion such that the radiative cooling coating 10 should be directly facing the general direction of sunlight 40.

The radiative cooling coating 10 can be selected from a wide range of materials, including but not limited to titanium dioxide, zinc oxide, silicon dioxide, aluminium oxide, or a combination thereof.

The novel glazing panel has a thermal transmittance (U-value) of lower than 0.7 $W/m^2$ K and a Solar Heat Gain Coefficient (SHGC) of lower than 0.2. Radiation-induced temperature increase can also be reduced by 2-4 degrees Celsius by the novel glazing panel.

For example, to optimize the experience in the interior of the building with the installation of these glazing panels by optimizing heat insulation, the novel glazing panel may be configured to have a U-value of 0.5-0.6, an SHGC of 0.10-0.15, thereby reducing the temperature increase induced by radiation by up to 4 degrees Celsius. Alternatively, the novel glazing panel may also be configured to have a U-value of 0.6-0.7, an SHGC of 0.15-0.20 and a reduction in the temperature increase induced by radiation by 2 degrees Celsius. Such a configuration allows the glazing panel to achieve higher light transmission rate while retaining decent heat insulation properties against solar radiation.

Meanwhile, the novel glazing panel also has an average power generation of at least 35 $W/m^2$ under illumination intensity of 1000 $W/m^2$. For example, the average power generation of the novel glazing panel can achieve 35-40 $W/m^2$ under illumination intensity of 1000 $W/m^2$, under a configuration in which the cost of production may be optimized. Alternatively, the average power generation of the novel glazing panel can be configured to 40-50 $W/m^2$ under illumination intensity of 1000 $W/m^2$ to further enhance solar power conversion to support electricity consumption of the building itself.

The novel glazing panel, in addition to the excellent heat insulation and photovoltaic properties, maintains a high light transmission rate of at least 40%. For example, the novel glazing panel can be configured to a light transmission rate of 40-42% to allow better heat insulation as described above. Alternatively, the novel glazing panel can be configured to a light transmission rate of 42-45% to allow better daylighting for more effective internal lighting.

Figure 2:
FIG. 2 shows the photograph of the assembled photovoltaic glazing module of the present invention.

As illustrated and FIG. 1 and shown in the photograph of FIG. 2, the photovoltaic glazing 20 should be sized to fit into the frame of the sound and thermal insulating module 30, such that distance between the photovoltaic glazing 20 and the glazing component of the sound and thermal insulating module 30 is minimized, thereby achieving a compact structure of the photovoltaic glass panel for more efficient installation as a construction material.

Specifically, the photovoltaic glazing panel as shown in FIG. 2 utilizes a combination of hollow glazing and vacuum glazing for the sound and thermal insulating module 30. The combination of the two types of glazing optimizes both the heat insulating properties of the glazing and minimizes noise intrusion into the interior of the building.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they allow for elements not explicitly recited, but exclude elements that are found in the prior art or that affect a basic or novel characteristic of the present invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Other definitions for selected terms used herein may be found within the detailed description of the present invention and apply throughout. Unless otherwise defined, all other technical terms used herein have the same meaning as commonly understood to one of ordinary skill in the art to which the present invention belongs.

It will be appreciated by those skilled in the art, in view of these teachings, that alternative embodiments may be implemented without undue experimentation or deviation from the spirit or scope of the invention, as set forth in the appended claims. This invention is to be limited only by the following claims, which include all such embodiments and modifications when viewed in conjunction with the above specification and accompanying drawings.

The invention claimed is:

1. A thermal-managed photovoltaic glass glazing panel for installation into a window frame or a façade of a building, comprising:

a photovoltaic glazing comprising low-iron glazing, solar cell sheet, laminating film, rear glazing and specialized metal conductors, wherein the solar cell sheet is hermetically sealed between the low-iron glazing and the rear glazing;

a thermal insulation layer coated on the front surface of the photovoltaic glazing, wherein the thermal insulation layer includes a passive radiative cooling coating material; and a sound and thermal insulation module independent from the photovoltaic glazing, wherein the sound and thermal insulation module comprises a combination of vacuum glazing and hollow glazing connected using adhesive bonding, and wherein the sound and thermal insulation module is adhered to the rear side of the photovoltaic glazing;

wherein the thermal-managed photovoltaic glass glazing panel is arranged such that the thermal insulation layer is facing externally from the building;

wherein the thermal-managed photovoltaic glass glazing panel has a light transmission rate of at least 40%;

wherein the thermal-managed photovoltaic glass glazing panel reduces radiation-induced temperature increase by 2-4 degrees Celsius;

wherein the thermal-managed photovoltaic glass glazing panel has a thermal transmittance of lower than 0.7 and a Solar Heat Gain Coefficient of lower than 0.2 across the panel; and wherein the thermal-managed photovoltaic glass glazing panel has an average power generation of at least 35 $W/m^2$ under illumination intensity of 1000 $W/m^2$.

2. The thermal-managed photovoltaic glass glazing panel of claim 1, wherein the passive radiative cooling coating material is selected from titanium dioxide, zinc oxide, silicon dioxide, aluminium oxide or a combination thereof.

3. A solar power-generating glass construction material used for the exterior of a building comprising the thermal-managed photovoltaic glass glazing panel of claim 1, wherein:

the solar power-generating glass construction material has a light transmission rate of at least 40%;

the solar power-generating glass construction material reduces radiation-induced temperature increase by 2-4 degrees Celsius; and the solar power-generating glass construction material has an average power generation rate of at least 35 $W/m^2$ under illumination intensity of 1000 $W/m^2$.

* * * * *